No. 655,789. Patented Aug. 14, 1900.
A. LÉGÉ & W. H. ENGLAND.
APPARATUS FOR COLOR PHOTOGRAPHY.
(Application filed Dec. 2, 1899.)

(No Model.) 7 Sheets—Sheet 2.

No. 655,789. Patented Aug. 14, 1900.
A. LÉGÉ & W. H. ENGLAND.
APPARATUS FOR COLOR PHOTOGRAPHY.
(Application filed Dec. 2, 1899.)

(No Model.) 7 Sheets—Sheet 4.

No. 655,789. Patented Aug. 14, 1900.
A. LÉGÉ & W. H. ENGLAND.
APPARATUS FOR COLOR PHOTOGRAPHY.
(Application filed Dec. 2, 1899.)
(No Model.) 7 Sheets—Sheet 7.

UNITED STATES PATENT OFFICE.

ANNIBAL LÉGÉ AND WILLIAM HENRY ENGLAND, OF LONDON, ENGLAND.

APPARATUS FOR COLOR PHOTOGRAPHY.

SPECIFICATION forming part of Letters Patent No. 655,789, dated August 14, 1900.

Application filed December 2, 1899. Serial No. 739,027. (No model.)

*To all whom it may concern:*

Be it known that we, ANNIBAL LÉGÉ, a citizen of the Republic of France, and WILLIAM HENRY ENGLAND, a subject of the Queen of England, both residing at London, England, have invented certain new and useful Photographic Apparatus for Color Photography, (for which we have made application for Letters Patent in Great Britain under No. 10,318, dated May 16, 1899, and No. 23,039, dated November 20, 1899,) of which the following is a specification.

The object of this invention is to provide a camera for color photography in which the exposure-shutter and the movable sensitized layer and color-filter commonly used in this kind of photography may be operated pneumatically from a common source of air under pressure.

The invention also has further reference to a timing device to regulate the automatic admission of air to the pneumatic device or devices for operating the aforesaid elements.

In the accompanying drawings, which illustrate the apparatus for carrying out this invention.

Like letters indicate like parts throughout the drawings.

Referring first to Figs. 1 to 7, the camera for carrying out this invention may be either a box-camera or provided with bellows in the usual well-known manner and has at its rear a slide or box A. The dark slide B for carrying the sensitized layer may be secured in any convenient manner to or made in one with a frame B', within which is the color-filter, and both are made to slide together in the box A. To permit of refilling the dark slide B, it may be made detachable from the color-filter B' or arranged to draw out of the top of the box A, together with the color-filter. To keep both devices in position, one or more springs A' may be secured to the back of the box A, so that the dark slide and color-filter are always pressed firmly against its front end. The parts B B' are normally retained in a raised position by a detent C, Fig. 2, carried by a spring C', arranged at the side of the box A, the detent projecting through the side of the latter and engaging a pin or projection $B^2$ on the dark slide B. Above the pin $B^2$ are arranged two other pins $B^3 B^4$, respectively, each adapted to be engaged in turn by the detent C in order that the different portions of the sensitized layer and color-filter may be presented in succession to the light from the lens. To release the detent from its engagement with any one pin, a pneumatic device D is provided, comprising a ratchet D', carrying cams $D^2 D^3$ and free to revolve about a fixed pin $D^4$. A pawl $D^5$ is arranged to engage the ratchet D' and is pivoted at $D^6$ to a cylinder $D^7$. The cylinder $D^7$ slides upon a stationary piston $D^8$, Fig. 5, and the latter is provided with a longitudinal orifice communicating with the interior of the cylinder $D^7$ and a conduit $D^9$. A spring $D^{10}$ normally keeps the cylinder $D^7$ drawn back upon its piston $D^8$, and a spring $D^{11}$ keeps the pawl $D^5$ in engagement with the ratchet D'. The ratchet D' is also provided with any convenient form of retaining device, such as a spring-controlled pawl $D^{12}$. The ratchet D', with the cams $D^2 D^3$, is so disposed in relation to the spring C' that as the ratchet is revolved by the pneumatically-actuated pawl $D^5$ the cams pass under the end of the spring and by forcing the same up release the detent C from its engagement with the dark slide B.

A dash-pot E, having a plunger E', is arranged at the side of the box A to retard the downward movement of the parts B B' when released from engagement with the detent. The plunger E' is secured to the parts B B' by a pin $E^2$, which slides in a slot in the wall of the box A. That end of the plunger $E'$ which works in the dash-pot E is provided with a channel $E^3$ for the purpose of allowing air or other fluid contained in the dash-pot to pass from one side of the plunger to the other, and a screw $E^4$ is provided to control the flow of the said fluid through the passage $E^3$.

The exposure-shutter F is hinged or pivoted to the lens-holder $F'$ by a spindle $F^2$, made fast to the shutter and free to turn in its bearings on the lens-holder. On one end of the spindle $F^2$ is a pinion $F^3$, operated at stated intervals by a pneumatic device G, similar to the device D. This device G comprises a pneumatically-operated pawl $G'$, arranged in the same manner as the pawl $D^5$, being pivoted at $G^2$ to a cylinder $G^3$. The cylinder $G^3$ works upon a piston $G^4$ in the same manner as the cylinder $D^7$ and is normally drawn over the piston by a spring $G^5$. The pawl $G'$ is kept in engagement with a ratchet $G^7$ by a spring $G^6$, and the ratchet is free to turn about a pin or stud $G^8$. Secured to the ratchet $G^7$ is a wheel $G^9$, having interrupted teeth. The teeth are arranged in two sets $G^{10}$ $G^{11}$, respectively, each of which in turn engages and releases the pinion $F^3$, and as this latter only performs part of a revolution during each engagement it may be provided with teeth on one side only. A retaining-pawl $G^{12}$ is provided to prevent any return movement of the ratchet $G^7$, and as the latter when operating the shutter is likely to be carried beyond the point to which it is moved by the pawl $G'$ by the impetus of the shutter a spring $G^{13}$ is made to bear upon it to act as a brake. The pistons of the pneumatic devices D G are connected by conduits H J, respectively, which communicate with a common source of air under pressure, such as the rubber bulb K, which may be contracted by hand when it is desired to operate the pneumatic mechanisms.

Figure 1:
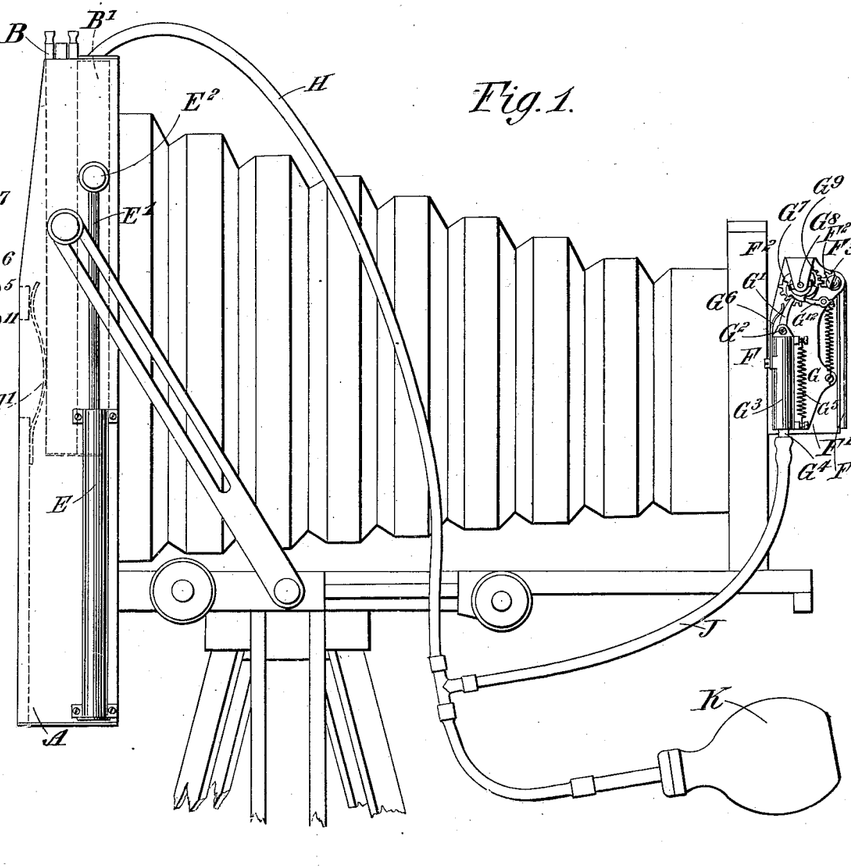
Figure 1 is a side elevation of a camera in which the sensitized layer and color-filter are both arranged at its rear.
Figure 2:
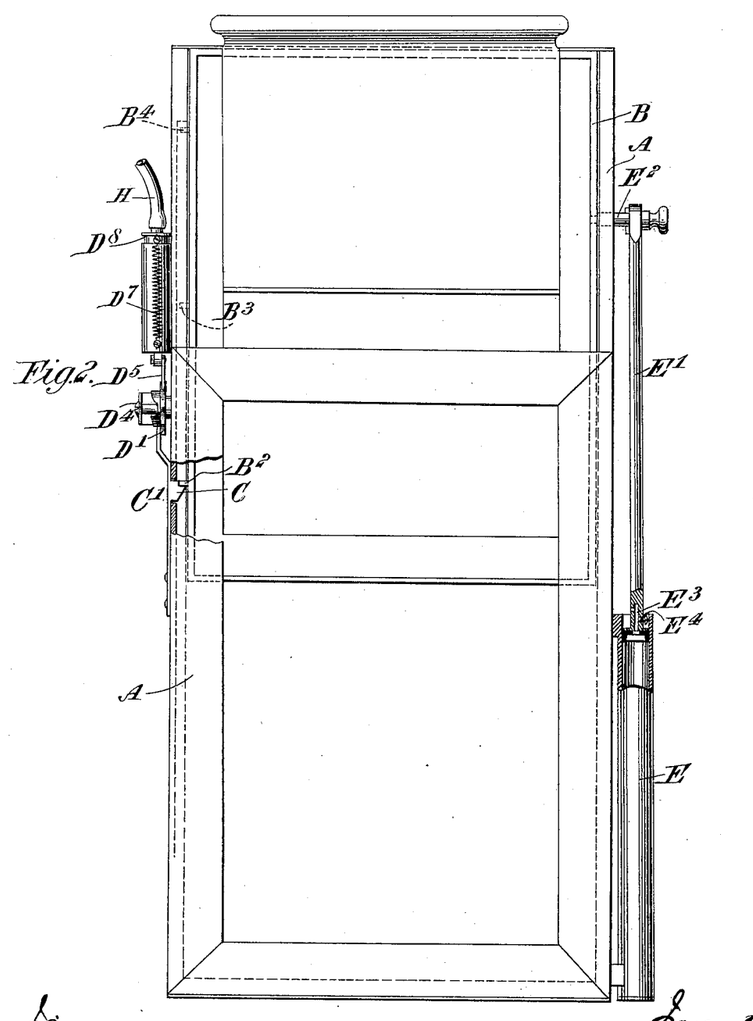
Fig. 2 is a rear elevation of Fig. 1.
Figure 3:
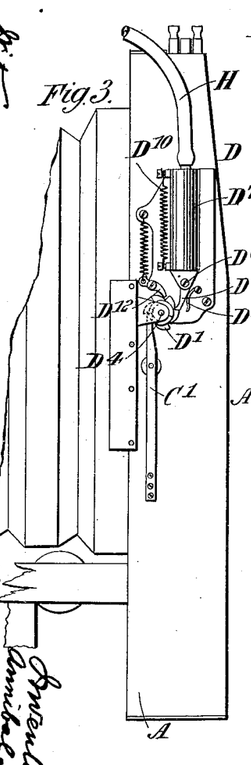
Fig. 3 is a side elevation of a portion of the camera, showing the mechanism on the far side of Fig. 1.
Figure 4:
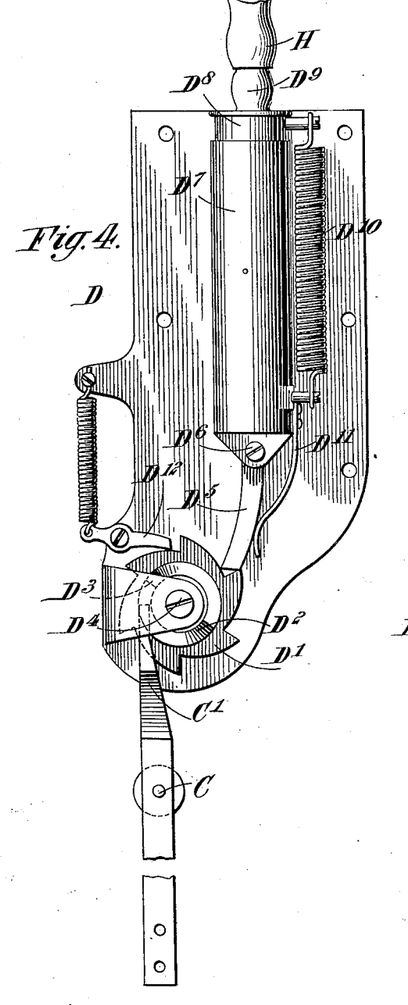
Figs. 4, 5, and 6 are detail views of the pneumatic sensitized layer and color-filter-operating device.
Figure 5:
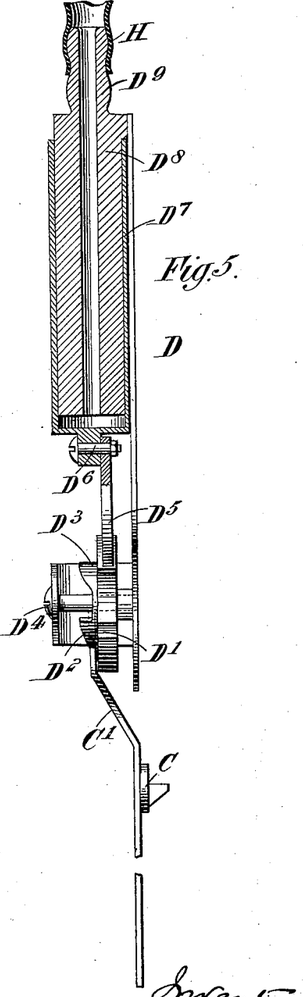
Figures 6, 7, 13:
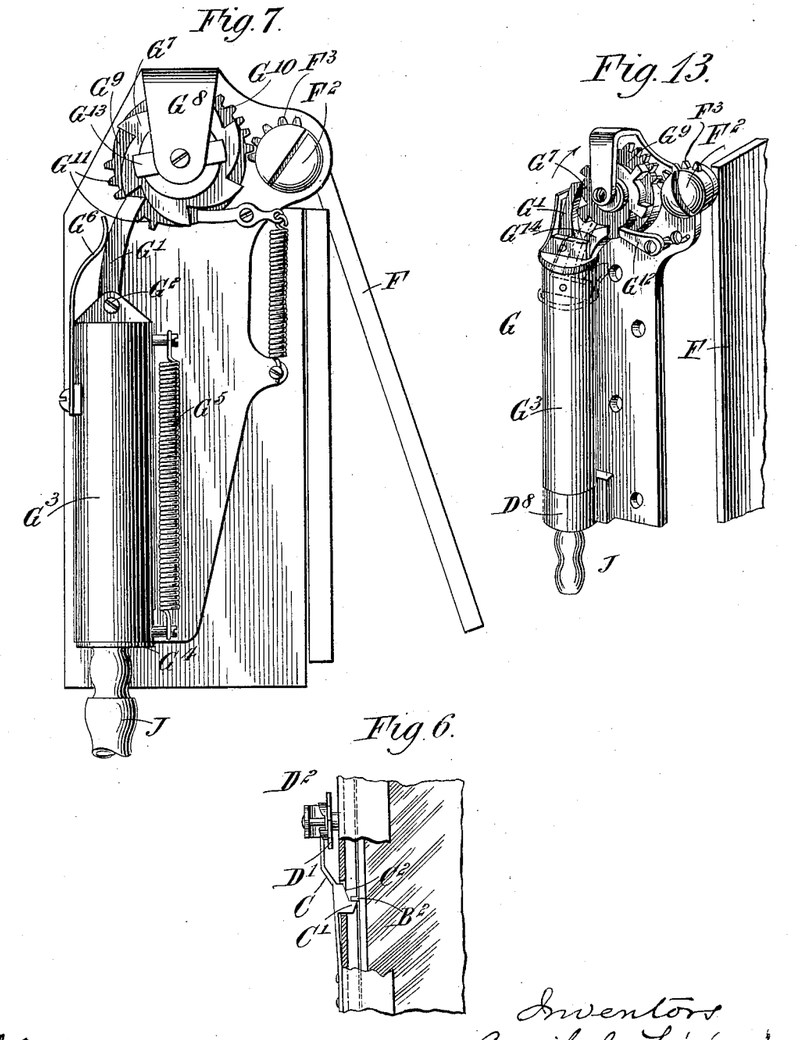
Fig. 7 is a detail view of the pneumatic shutter-operating device.
Fig. 13 is a perspective view of a modified construction of a pneumatic shutter-operating device.

The operation of the device is as follows: Assuming the various parts of the apparatus to be in the relative positions shown in Figs. 1 to 5, the first operation of the bulb K will cause air under pressure to pass simultaneously through the conduits H J and propel forward the cylinders $D^7$ $G^3$ against the action of their springs $D^{10}$ and $G^5$. By this means the pawl $D^5$ will move its ratchet $D'$ forward one tooth, bringing the cam $D^2$ toward the spring $C'$ of the detent C, while the pawl $G'$ will operate its ratchet $G^7$, propelling it forward one tooth, so that the teeth $G^{10}$ of the wheel carried by the ratchet shall engage the teeth on the pinion $F^3$, secured to the shutter, and by revolving the pinion cause the shutter F to be raised. Fig. 7 shows the commencement of this operation, the cylinder $G^3$ having performed part of its stroke only and the shutter F having commenced to rise. As soon as the bulb K is relieved of pressure the cylinders $D^7$ $G^3$ are returned to their normal positions by their respective springs, the pawls being each in a position to engage another tooth of their ratchets. During the withdrawal of the pawls $D^5$ $G'$ the retaining-pawls $D^{12}$ $G^{12}$ prevent the ratchets from being drawn back into their former positions. The shutter being thus opened, light passes through the camera in the usual well-known manner and acts upon that part of the plate or other sensitized layer exposed to it through the particular color-filter with which the sensitized layer is covered. A sufficient time having elapsed for the exposure, the bulb K is again operated, causing the pawls $D^5$ $G'$ to revolve their respective ratchets another tooth in the same manner as formerly described, so that the cam $D^2$ is brought still nearer the spring $C'$ of the detent C and the wheel $G^9$ revolved so that the teeth $G^{10}$ pass beyond the pinion $F^3$, and thus allow the shutter to close under the action of gravity. The bulb K is now again operated, thus propelling each ratchet forward the distance of another tooth, so that the cam $D^2$ on the ratchet $D'$ is made to pass under the spring $C'$, thus raising the detent C and allowing the pin $B^2$ to escape. The parts B $B'$ are thus permitted to slide down in the box A until the pin $B^3$ engages with the detent C, which has in the meantime returned to its normal position under the action of the spring $C'$. The movement of the ratchet $G^7$ has at the same time caused that part of the wheel $G^9$ which is not provided with teeth to pass the pinion $F^3$, so that the teeth $G^{11}$ are in position to engage the said pinion at the next operation of the bulb K. The operations described above are now repeated, exposing the second portion of the sensitized layer, with its particular color-filter, and after that the third portion of the same, with its color-filter, which completes the three impressions it is desired to take. Any number of sensitized layers may be exposed in this manner, and, if desired, the box A may be made sufficiently deep to allow the parts B $B'$ to drop below the position for receiving the impression after the last part of the sensitized layer has been exposed to the light in case the shutter F by any accident should be again opened and the sensitized layer spoiled.

It will be understood that the object of the dash-pot E is to regulate the descent of the parts B $B'$ when released from the detent C, so that unnecessary vibration may be avoided which might displace the position of the camera relatively to its subject. As an alternative to this the detent may be constructed with a sloping or cam face $C^2$, as shown in Fig. 6, so that the pin following that which has been released may strike the part $C^2$ and so be retarded in its descent by forcing the spring $C'$ back until the pin reaches the detent C. The under side of the detent C is also so shaped that when the parts B $B'$ are raised by hand it may not hinder the passage of the pins $B^4$ $B^3$ $B^2$.

Figure 8:
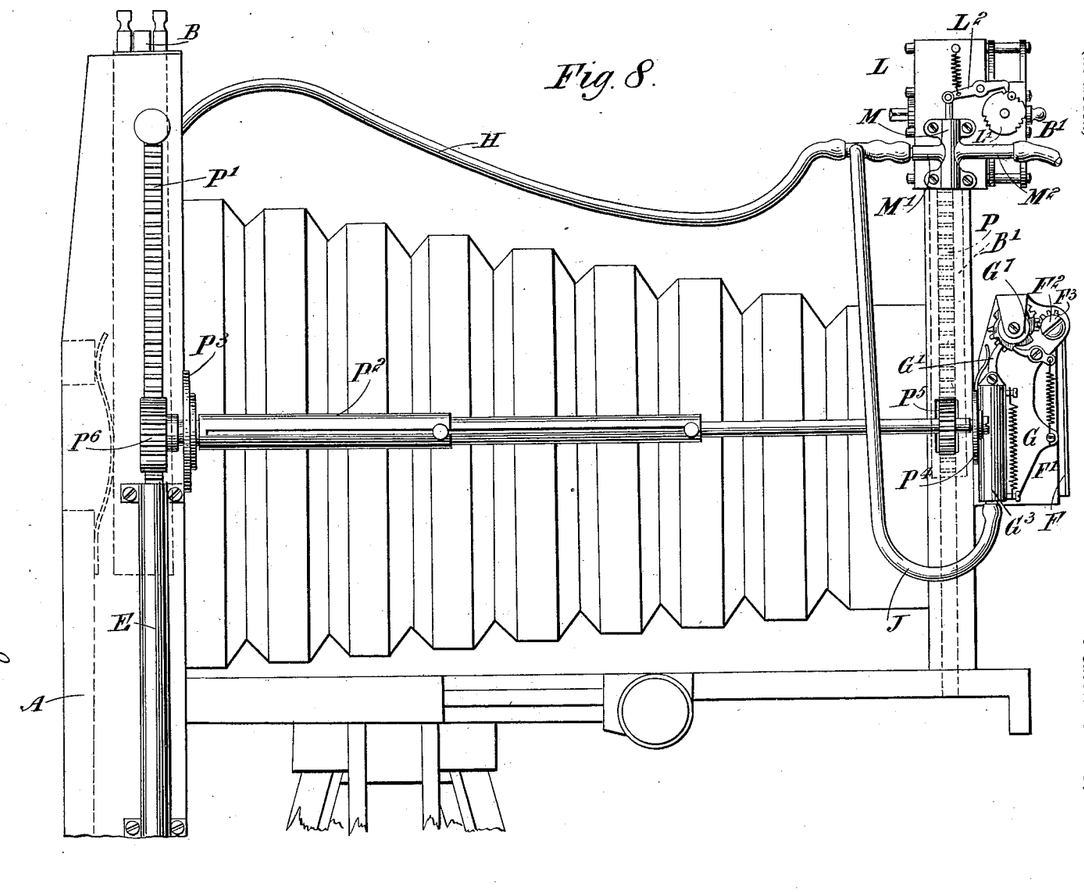
Fig. 8 is a side elevation of a pneumatically-operated camera fitted with the timing device.

As a substitute for operating the bulb K by hand a timing device L may be arranged at any convenient part of the camera to automatically admit compressed air at stated intervals to the pneumatic devices. The timing device L may conveniently be placed upon the fore part of the camera, as shown in Fig. 8, and comprises a revolving cam-plate L', against which one end of a lever $L^2$, formed to act as a detent, is made to bear. The lever $L^2$ is pivoted at $L^3$ and controlled by a spring $L^4$, which tends always to keep the detent end of the lever in contact with the cam-plate. Within close proximity to the lever $L^2$ is a cylinder M, with which communicate conduits M' $M^2$. The conduits M' $M^2$ communicate with the cylinder at opposite sides, so that they face one another, and within the cylinder is a piston $M^3$, connected by a link $M^4$ to that end of the lever $L^2$ remote from the cam-plate L'. The piston $M^3$ is bored transversely at $M^5$. The cam-plate L' is provided with three sets of recesses $l$ $l'$ $l^2$, respectively, each set comprising three recesses, which are of such a depth that when the end of the lever $L^2$ descends into any one of them the piston $M^3$ is raised in its cylinder M until the transverse boring or orifice $M^3$ is brought in line with the conduits M' $M^2$. Any convenient motive mechanism may be used to drive the cam-plate L'; but a clockwork-train N, mounted in a frame N' and controlled by a fly $N^2$, is preferred, and means may be provided to regulate the speed at which the cam-plate L' is rotated relatively to that of the mechanism by which it is driven. In the timing device shown in the drawings the cam-plate L' is carried at the end of a spindle $N^3$, free to revolve in bearings formed in the framing N', and a roller $N^4$ is mounted upon the spindle $N^3$ and is free to move longitudinally with the same, though compelled to revolve with it. The roller $N^4$ carries a clutch-ring $N^5$, with which a shifting device $N^6$ engages, so that the position of the roller $N^4$ may be adjusted upon the spindle $N^3$ by sliding the shifting device $N^6$ in a slot $N^7$ in the framing N'. The roller $N^5$ bears against a disk $N^8$, carried by one of the wheels of the clockwork-train. The operation of this timing device is as follows: The conduit $M^2$ having been connected to any source of air under pressure, such as a chamber into which a store of air has been previously compressed, the conduit M' to the pneumatic devices D G, and the various parts of the apparatus placed in position as before, the mechanism N is set in movement. The disk $N^8$ will thus be set in motion and will drive the roller $N^4$ with the spindle $N^3$ and cam-plate L'. Assuming the cam-plate to revolve in the direction indicated by the arrow, the last of the recesses $l$ is shortly brought under the detent of the lever $L^2$, so that the latter drops into it and momentarily raises the piston $M^3$. This allows a discharge of compressed air from the reservoir through the conduit $M^2$, orifice $M^5$, and conduit M' to the pneumatic devices D G. As in the case of the first operation by hand the shutter F is opened by this discharge of air and remains so until the cam-plate has traveled around a sufficient distance to bring the first recess of the set $l'$ under the detent of the lever, when a second discharge of air will be permitted to pass to the pneumatic devices, which will close the shutter F and place the ratchets in the position described above with reference to the second operation by hand. The cycle of operations is continued with each of the recesses in the cam-plate, the operations of the shutter and sensitized layer and color-filter taking place in the order formerly described until the parts B B' are finally dropped below the position where they are exposed to the light from the lens by the last recess of the set $l^2$ being brought under the detent of the lever $L^2$, thus causing the same to deliver the final discharge of air to the conduit M'. The cycle of operations having thus been completed, it is desirable that the driving mechanism should be stopped while a fresh sensitized layer is placed in the part B and the parts B B' raised into their former position. To effect this automatically, an auxiliary cam O may be secured to the cam-plate L' after the second recess of the set $l$, so that as the cam-plate continues its rotation the detent of the lever $L^2$ will rise upon the auxiliary cam O, thus depressing the opposite end of the lever. A pin O' is secured to this end of the lever $L^2$ and may conveniently serve to secure the link $M^4$ to the lever and projects through the case or frame N' of the clockwork-train. On the fly-wheel $N^2$ is secured an arm $O^2$, which normally avoids the pin O'; but the latter when depressed, as described above, is brought into the path of the arm $O^2$, which it engages, thus stopping the revolution of the fly-wheel $N^2$ and the whole of the mechanism N.

The speed of the cam-plate L' relatively to that of the mechanism N is regulated by sliding the roller $N^4$ on the shaft $N^3$ by means of the shifting device $N^6$, thus placing it nearer to or farther from the center of the revolving disk $N^8$ and causing it to perform a smaller or greater number of revolutions per revolution of the disk. In cases where it is not desired to regulate the speed of the cam-plate in this manner the cam-plate may be driven direct from the mechanism N and, if convenient, may be substituted for the disk $N^8$.

To permit the free movement of the piston $M^3$ in its cylinder M, the latter may be provided with an orifice $m$, by which the interior of the cylinder is allowed to communicate with the external atmosphere, and to allow the escape of air under pressure from the pneumatic devices D and G, after they have performed their work the piston $M^3$ may, if desired, be provided with a passage $m'$, so that when the piston has returned to its normal position the conduit M' may be thrown into communication with the atmosphere by an outlet M², formed in the side of the cylinder M.

Figure 10:
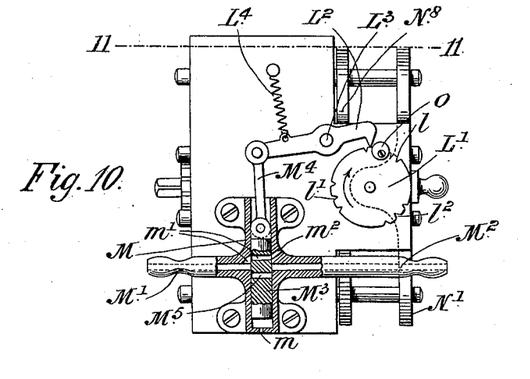
Fig. 10 is an end elevation of the timing device.
Figure 11:
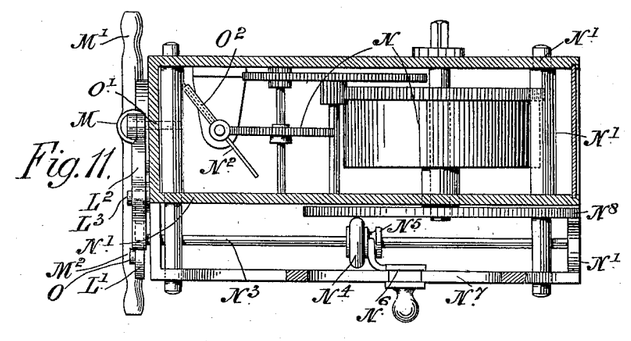
Fig. 11 is a horizontal section of the timing device on the line 11 11 of Fig. 10.
Figure 12:
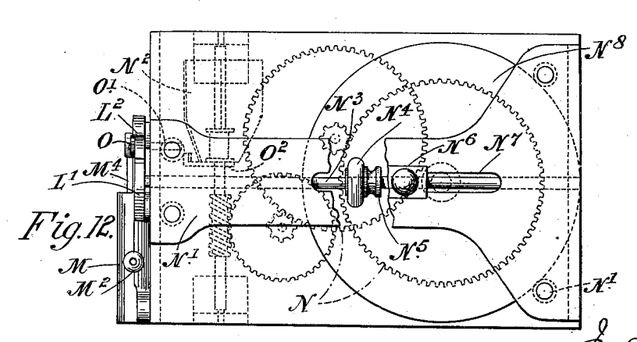
Fig. 12 is a side elevation of Fig. 10.

It is obvious that the recesses in the cam-plate may be arranged in any convenient manner to suit different requirements, or in place of recesses projections may be used, and the auxiliary cam O may be made as part of the cam-plate or secured eccentrically to the same by a screw, Fig. 10, to allow of its being adjusted.

In place of the valve M M³ admitting air from a reservoir to the pneumatic devices the piston M³ and cylinder M may be made in the form of a force-pump to drive air into the pneumatic devices when operated by the lever L².

Figure 9:
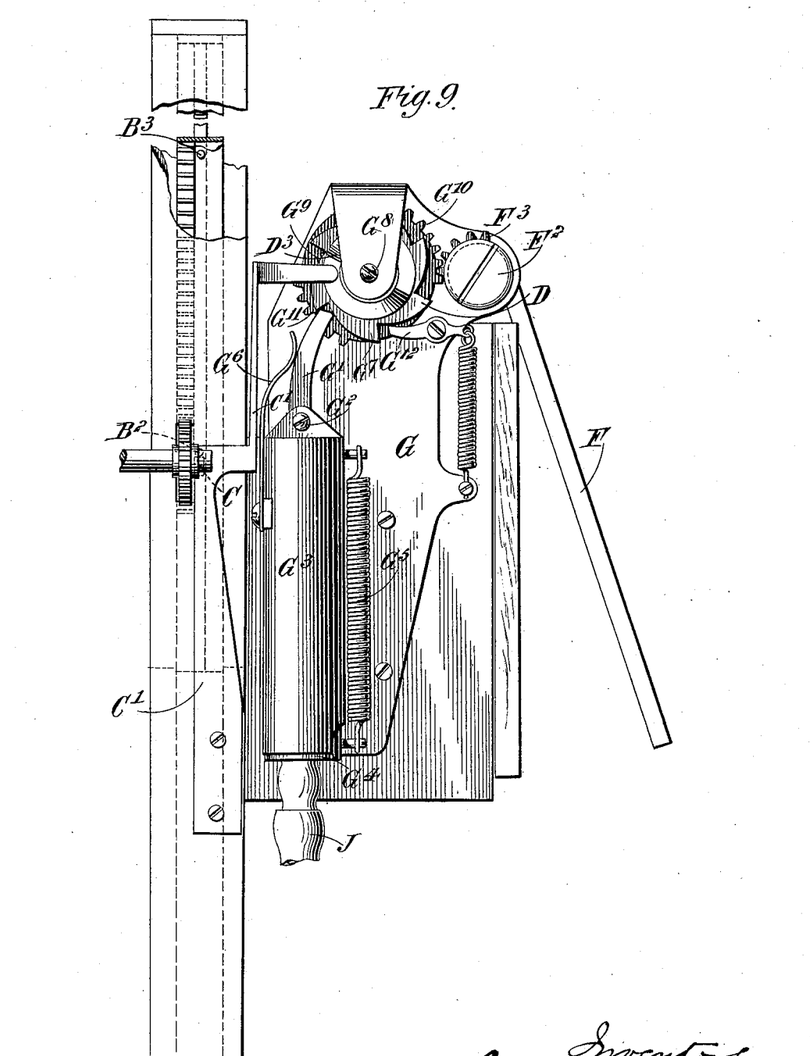
Fig. 9 is a detail view of a modified construction of pneumatic operating mechanism.

Fig. 8 shows a device by which the color-filter and sensitized layer are operatively connected, while the former is arranged to slide in suitable grooves placed in close proximity to the lens and the latter at the rear of the camera, as before. This arrangement is of considerable advantage, as it permits the use of smaller color-filters than when these are placed immediately before the sensitized layer, and thus saves expense. One detent is used to release the sensitized layer and color-filter, as before, and to effect the coöperation of the two parts a rack P is secured to the side of the color-filter or its frame, and a similar rack P', which may also serve as the plunger-rod for the dash-pot E, is secured to the frame B of the sensitized layer. A telescopic shaft P², carried in bearings P³ P⁴, extends from one end of the camera to the other and is provided with pinions P⁵ P⁶, (one at either end,) the former gearing with the rack P and the latter with the rack P'. It is obvious that by this means when the part B is released, as before described, from its engagement with the detent C (not shown in this figure) in descending it will rotate the pinion P⁶ and its shaft P² by means of the rack P'. The rotation of the shaft P² will revolve the pinion P⁵ and allow the rack P, with its color-filter, to descend. The color-filter being in this arrangement, as aforesaid, smaller than the sensitized layer will not have so far to descend at each operation, so that its operating-pinion P⁵ is made smaller than the pinion P⁶. When this arrangement of sensitized layer and color-filter is used, it is obvious that the detent C may be placed at the head of the camera to operate the color-filter, in which case the pneumatic device D, described with reference to Figs. 1 to 7, may be dispensed with, the cams D² D³ being placed upon the ratchet G⁷, as shown in Fig. 9. Again, whether the color-filter is arranged at the front or rear of the camera the detent C may be arranged at the rear and provided with an extensible arm to engage the cams D² D³ when placed on the ratchet G⁷, or the ratchet G⁷ may be geared to the ratchet D' by an extensible shaft and gearing.

It is obvious that the different parts of mechanism described in connection with this invention may be variously modified without departing from the nature of the invention. For instance, the shutter F may be provided with a projection only in the place of the pinion F², and this projection may be engaged at stated intervals by a projection or cam on the ratchet G⁷. Also any convenient system of levers may be used to connect the color-filter at the front of the camera and the sensitized layer at the rear of the same, so that they shall move in unison.

Fig. 13 shows a modified construction of the shutter-operating mechanism, the spring G¹³ being dispensed with and an automatic stop being provided in its place to prevent the overrunning of the ratchet. Secured to the part G³ which carries the pawl G' is a stop G¹⁴, and the teeth on the ratchet G⁷ are so formed that when the pawl G' is in its advanced position, as shown in full lines in Fig. 13, one of the ratchet-teeth will butt against the stop G¹⁴. The moment a tooth of the ratchet G⁷ strikes the projection G¹⁴ the ratchet, together with the shutter F, if this is being operated at that moment, are both deprived of their impetus, so that when the pawl, with the projection G¹⁴, returns to its normal position, as indicated in dotted lines, there will be no tendency for the ratchet to overrun, and the shutter, if open, will be prevented from closing by the retaining device G¹², as before. It is obvious that in place of using the same teeth which are operated by the pawl to engage with the stop G¹⁴ another set of teeth or a series of projections may be formed upon the ratchet to serve the same purpose.

If desired, the shutter F may be opened against the action of a spring under the control of which it will close when released instead of under the action of gravity. The dash-pot E may also be dispensed with and a spring or counterbalance used as a substitute, if preferred.

What we claim as our invention, and desire to secure by Letters Patent, is—

1. In a camera for color photography the combination of a lens-holder, an exposure-shutter, a pneumatic shutter-operating mechanism, a color-filter, slides for a sensitized layer and the color-filter, a detent for the layer and color-filter, a pneumatic releasing device for that detent, a source of air under pressure and conduits connecting that source with the pneumatic shutter-operating mechanism and releasing device aforesaid, substantially as set forth.

2. In a camera for color photography the combination of a lens-holder, an exposure-shutter, a pneumatic shutter-operating mechanism, a color-filter, slides for a sensitized layer and the color-filter, a detent for the layer and color-filter, a pneumatic releasing device for that detent, a source of air under pressure, conduits connecting that source with the pneumatic shutter-operating mechanism and releasing device aforesaid and a timing mechanism for the air-supply substantially as set forth.

3. In a camera for color photography the combination of a lens-holder, an exposure-shutter, a pneumatic shutter-operating mechanism, a color-filter, slides for a sensitized layer and the color-filter, a detent for the layer and color-filter, a pneumatic releasing device for that detent, a source of air under pressure, conduits connecting that source with the pneumatic shutter-operating mechanism and releasing device aforesaid, a timing mechanism for the air-supply and a stopping device for the same, substantially as set forth.

4. In a camera for color photography the combination of a lens-holder, an exposure-shutter, a pneumatic shutter-operating mechanism, a color-filter, slides for a sensitized layer and the color-filter, a detent for the layer and color-filter operatively connected with the pneumatic shutter-operating mechanism, a source of air under pressure, and a conduit connecting that source with the pneumatic shutter-operating mechanism, substantially as set forth.

5. In a camera for color photography the combination of a lens-holder, an exposure-shutter, a pneumatic shutter-operating mechanism, a color-filter, slides for a sensitized layer and the color-filter, a detent for the layer and color-filter operatively connected with the pneumatic shutter-operating mechanism, a source of air under pressure, a conduit connecting that source with the pneumatic shutter-operating mechanism and a timing mechanism for the air-supply, substantially as set forth.

6. In a camera for color photography the combination of a lens-holder, an exposure-shutter, a pneumatic shutter-operating mechanism, a color-filter, slides for a sensitized layer and the color-filter, a detent for the layer and color-filter operatively connected with the pneumatic shutter-operating mechanism, a source of air under pressure, a conduit connecting that source with the pneumatic shutter-operating mechanism, a timing mechanism for the air-supply, and a stopping device for the same, substantially as set forth.

7. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a stop secured to a part which advances with the pawl, projections on the ratchet to engage the stop when the pawl is at the end of its stroke, a color-filter, slides for a sensitized layer and the color-filter, a detent for the layer and color-filter, a pneumatic releasing device for that detent, a source of air under pressure, and conduits connecting that source with the pneumatic shutter-operating mechanism and releasing device aforesaid, substantially as set forth.

8. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure and conduits connecting that source and the pneumatic operating devices aforesaid, substantially as and for the purpose set forth.

9. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, and a timing mechanism for the air-supply, substantially as and for the purpose set forth.

10. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle and motive mechanism operatively connected with the cam-spindle, substantially as and for the purpose set forth.

11. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle, motive mechanism operatively connected with the cam-spindle, and means for regulating the speed of the cam, substantially as and for the purpose set forth.

12. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, and motive mechanism operatively connected with the disk, substantially as and for the purpose set forth.

13. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, and a stopping device for the motive mechanism operatively connected with the cam-spindle, substantially as and for the purpose set forth.

14. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, a stopping-cam on the cam-spindle and a stopping device for the motive mechanism operatively connected with the stopping-cam, substantially as and for the purpose set forth.

15. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure and conduits connecting that source and the pneumatic operating devices aforesaid, substantially as and for the purpose set forth.

16. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, and a timing mechanism for the air-supply, substantially as and for the purpose set forth.

17. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle, and motive mechanism operatively connected with the cam-spindle, substantially as and for the purpose set forth.

18. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle, motive mechanism operatively connected with the cam-spindle, and means for regulating the speed of the cam, substantially as and for the purpose set forth.

19. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam-plate is secured, bearings to support that spindle, a friction-roller free to move endwise but not to rotate relatively to the spindle, a shifting device for adjusting and retaining the friction-roller, a friction-disk against which the friction-roller bears and motive mechanism operatively connected with the disk, substantially as and for the purpose set forth.

20. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, and a stopping device for the motive mechanism operatively connected with the cam-spindle, substantially as and for the purpose set forth.

21. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the layer and color-filter, a ratchet-wheel, a cam connected with the ratchet-wheel and adapted to operate the catch, a pawl for the cam ratchet-wheel, a pneumatic operating device for that pawl, a source of air under pressure, conduits connecting that source and the pneumatic operating devices aforesaid, a valve in those conduits, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, a stopping-cam on the cam-spindle, and a stopping device for the motive mechanism operatively connected with the stopping-cam, substantially as and for the purpose set forth.

22. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the same, a cam connected with the ratchet on the cam aforesaid and adapted to operate the catch, a source of air under pressure, and a conduit connecting that source with the pneumatic operating device aforesaid, substantially as and for the purpose set forth.

23. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the same, a cam connected with the ratchet on the cam aforesaid and adapted to operate the catch, a source of air under pressure, a conduit connecting that source and the pneumatic operating device aforesaid and a timing mechanism for the air-supply, substantially as and for the purpose set forth.

24. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the same, a cam connected with the ratchet on the cam aforesaid and adapted to operate the catch, a source of air under pressure, a conduit connecting that source and the pneumatic operating device aforesaid, a valve in that conduit, a cam controlling that valve, a lever operatively connected with the valve and bearing against the cam, a spindle to which the cam is secured, bearings to support that spindle and motive mechanism operatively connected with the cam-spindle, substantially as and for the purpose set forth.

25. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the same, a cam connected with the ratchet on the cam aforesaid and adapted to operate the catch, a source of air under pressure, a conduit connecting that source and the pneumatic operating device aforesaid, a valve in that conduit, a cam controlling that valve, a lever operatively connected with the valve and bearing against the cam, a spindle to which the cam is secured, bearings to support that spindle, motive mechanism operatively connected with the cam-spindle and means for regulating the speed of the cam, substantially as and for the purpose set forth.

26. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the same, a cam connected with the ratchet on the cam aforesaid and adapted to operate the catch, a source of air under pressure, a conduit connecting that source and the pneumatic operating device aforesaid, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, and motive mechanism operatively connected with the disk, substantially as and for the purpose set forth.

27. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the same, a cam connected with the ratchet on the cam aforesaid and adapted to operate the catch, a source of air under pressure, a conduit connecting that source and the pneumatic operating device aforesaid, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk and a stopping device for the motive mechanism operatively connected with the cam-spindle, substantially as and for the purpose set forth.

28. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a catch for the same, a cam connected with the ratchet on the cam aforesaid and adapted to operate the catch, a source of air under pressure, a conduit connecting that source and the pneumatic operating device aforesaid, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, a stopping-cam on the cam-spindle and a stopping device for the motive mechanism operatively connected with the stopping-cam, substantially as and for the purpose set forth.

29. In a camera for color photography the combination of a lens-holder, an exposure-shutter, a pneumatic shutter-operating mechanism, a color-filter, slides for a sensitized layer and the color-filter, a detent for the layer and color-filter operatively connected with the pneumatic shutter-operating mechanism, a source of air under pressure, a conduit connecting that source with the pneumatic shutter-operating mechanism, a valve in that conduit, a cam controlling that valve, a lever operatively connected with the valve and bearing against the cam, a spindle to which the cam is secured, bearings to support that spindle, and motive mechanism operatively connected with the cam-spindle, substantially as and for the purpose set forth.

30. In a camera for color photography the combination of a lens-holder, an exposure-shutter, a pneumatic shutter-operating mechanism, a color-filter, slides for a sensitized layer and the color-filter, a detent for the layer and color-filter operatively connected with the pneumatic shutter-operating mechanism, a source of air under pressure, a conduit connecting that source with the pneumatic shutter-operating mechanism, a valve in that conduit, a cam controlling that valve, a lever operatively connected with the valve and bearing against the cam, a spindle to which the cam is secured, bearings to support that spindle, motive mechanism operatively connected with the cam-spindle and means for regulating the speed of the cam, substantially as and for the purpose set forth.

31. In a camera for color photography the combination of a lens-holder, an exposure-shutter, a pneumatic shutter-operating mechanism, a color-filter, slides for a sensitized layer and the color-filter, a detent for the layer and color-filter operatively connected with the pneumatic shutter-operating mechanism, a source of air under pressure, a conduit connecting that source with the pneumatic shutter-operating mechanism, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears and motive mechanism operatively connected with the disk, substantially as and for the purpose set forth.

32. In a camera for color photography the combination of a lens-holder, an exposure-shutter, a pneumatic shutter-operating mechanism, a color-filter, slides for a sensitized layer and the color-filter, a detent for the layer and color-filter operatively connected with the pneumatic shutter-operating mechanism, a source of air under pressure, a conduit connecting that source with the pneumatic shutter-operating mechanism, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, and a stopping device for the motive mechanism operatively connected with the cam-spindle, substantially as and for the purpose set forth.

33. In a camera for color photography the combination of a lens-holder, an exposure-shutter, a pneumatic shutter-operating mechanism, a color-filter, slides for a sensitized layer and the color-filter, a detent for the layer and color-filter operatively connected with the pneumatic shutter-operating mechanism, a source of air under pressure, a conduit connecting that source with the pneumatic shutter-operating mechanism, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, a stopping-cam on the cam-spindle and a stopping device for the motive mechanism operatively connected with the stopping-cam, substantially as and for the purpose set forth.

34. In a camera for color photography the combination of a lens-holder, an exposure-shutter, a pneumatic shutter-operating mechanism, a color-filter, slides for a sensitized layer and the color-filter, a detent for the layer and color-filter, a pneumatic releasing device for that detent, a source of air under pressure, conduits connecting that source with the pneumatic shutter-operating mechanism and releasing device aforesaid, a valve in those conduits, a cam controlling that valve, a lever operatively connected with the valve and bearing against the cam, a spindle to which the cam is secured, bearings to support that spindle and motive mechanism operatively connected with the cam-spindle, substantially as and for the purpose set forth.

35. In a camera for color photography the combination of a lens-holder, an exposure-shutter, a pneumatic shutter-operating mechanism, a color-filter, slides for a sensitized layer and the color-filter, a detent for the layer and color-filter, a pneumatic releasing device for that detent, a source of air under pressure, conduits connecting that source with the pneumatic shutter-operating mechanism and releasing device aforesaid, a valve in those conduits, a cam controlling that valve, a lever operatively connected with the valve and bearing against the cam, a spindle to which the cam is secured, bearings to support that spindle, motive mechanism operatively connected with the cam-spindle and means for regulating the speed of the cam, substantially as and for the purpose set forth.

36. In a camera for color photography the combination of a lens-holder, an exposure-shutter, a pneumatic shutter-operating mechanism, a color-filter, slides for a sensitized layer and the color-filter, a detent for the layer and color-filter, a pneumatic releasing device for that detent, a source of air under pressure, conduits connecting that source with the pneumatic shutter-operating mechanism and releasing device aforesaid, a valve in those conduits, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears and motive mechanism operatively connected with the disk substantially as and for the purpose set forth.

37. In a camera for color photography the combination of a lens-holder, an exposure-shutter, a pneumatic shutter-operating mechanism, a color-filter, slides for a sensitized layer and the color-filter, a detent for the layer and color-filter, a pneumatic releasing device for that detent, a source of air under pressure, conduits connecting that source with the pneumatic shutter-operating mechanism and releasing device aforesaid, a valve in those conduits, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk and a stopping device for the motive mechanism operatively connected with the cam-spindle substantially as and for the purpose set forth.

38. In a camera for color photography the combination of a lens-holder, an exposure-shutter, a pneumatic shutter-operating mechanism, a color-filter, slides for a sensitized layer and the color-filter, a detent for the layer and color-filter, a pneumatic releasing device for that detent, a source of air under pressure, conduits connecting that source with the pneumatic shutter-operating mechanism and releasing device aforesaid, a valve in those conduits, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, a stopping-cam on the cam-spindle and a stopping device for the motive mechanism operatively connected with the stopping-cam, substantially as and for the purpose set forth.

39. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a cam connected with the ratchet on the cam aforesaid and adapted to operate the catch, a source of air under pressure and a conduit connecting that source with the pneumatic operating device aforesaid, substantially as and for the purpose set forth.

40. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a cam connected with the ratchet on the cam aforesaid and adapted to operate the catch, a source of air under pressure, a conduit connecting that source with the pneumatic operating device aforesaid and a timing mechanism for the air-supply, substantially as and for the purpose set forth.

41. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a cam connected with the ratchet on the cam aforesaid and adapted to operate the catch, a source of air under pressure, a conduit connecting that source with the pneumatic operating device aforesaid, a valve in that conduit, a cam controlling that valve, a lever operatively connected with the valve and bearing against the cam, a spindle to which the cam is secured, bearings to support that spindle and motive mechanism operatively connected with the cam-spindle, substantially as and for the purpose set forth.

42. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a cam connected with the ratchet on the cam aforesaid and adapted to operate the catch, a source of air under pressure, a conduit connecting that source with the pneumatic operating device aforesaid, a valve in that conduit, a cam controlling that valve, a lever operatively connected with the valve and bearing against the cam, a spindle to which the cam is secured, bearings to support that spindle, motive mechanism operatively connected with the cam-spindle and means for regulating the speed of the cam, substantially as and for the purpose set forth.

43. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a cam connected with the ratchet on the cam aforesaid and adapted to operate the catch, a source of air under pressure, a conduit connecting that source with the pneumatic operating device aforesaid, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears and motive mechanism operatively connected with the disk, substantially as and for the purpose set forth.

44. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a cam connected with the ratchet on the cam aforesaid and adapted to operate the catch, a source of air under pressure, a conduit connecting that source with the pneumatic operating device aforesaid, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, and a stopping device for the motive mechanism operatively connected with the cam-spindle, substantially as and for the purpose set forth.

45. In a camera for color photography the combination of a lens-holder, an exposure-shutter pivoted thereon, a projection on the shutter, a cam to engage that projection, a ratchet on the cam, a pneumatic operating device, a pawl pivoted to that device and arranged to engage the ratchet on the cam, a color-filter, slides for a sensitized layer and the color-filter, a telescopic shaft operatively connected with the layer and color-filter, a catch for the layer and color-filter, a cam connected with the ratchet on the cam aforesaid and adapted to operate the catch, a source of air under pressure, a conduit connecting that source with the pneumatic operating device aforesaid, a valve in that conduit, a cam controlling that valve, a lever operatively connected with the valve and bearing against the cam, a spindle to which the cam is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, a stopping-cam on the cam-spindle and a stopping device for the motive mechanism operatively connected with the stopping-cam, substantially as and for the purpose set forth.

46. In a camera for color photography the combination of a lens-holder, an exposure-shutter pivoted thereon, a pinion secured to the shutter, a wheel having interrupted teeth to engage the shutter-pinion at stated intervals, a ratchet on the wheel, a pneumatic operating device, a pawl pivoted to that device and arranged to engage the wheel-ratchet, a retaining device for the ratchet-wheel, a color-filter, slides for a sensitized layer and the filter, a telescopic shaft operatively connected with the layer and color-filter, a catch for the layer and color-filter, a ratchet-wheel, a cam connected with the ratchet-wheel and adapted to operate the catch, a pawl and a detent for the cam ratchet-wheel, a pneumatic operating device for that pawl, a brake for the layer and color-filter, a source of air under pressure, conduits connecting that source and the pneumatic operating devices aforesaid, a valve in those conduits, a cam-plate controlling that valve, a lever operatively connected with the valve and bearing against the cam, a spindle to which the cam-plate is secured, bearings to support that spindle, a friction-roller free to move endwise but not to rotate relatively to the spindle, a shifting device for adjusting and retaining the friction-roller, a friction-disk against which the friction-roller bears, motive mechanism operatively connected with the disk, a stopping-cam on the cam-plate spindle, and a stopping device for the motive mechanism operatively connected with the stopping-cam, substantially as and for the purpose set forth.

In testimony whereof we have signed our names to this specification in the presence of two subscribing witnesses.

ANNIBAL LÉGÉ.
WILLIAM HENRY ENGLAND.

Witnesses:
A. J. FRENCH,
ABE HAYWARD.